United States Patent
Yue

(10) Patent No.: US 10,110,397 B2
(45) Date of Patent: Oct. 23, 2018

(54) METHOD AND DEVICE FOR SWITCHING TUNNELS AND SWITCH

(71) Applicant: ZTE Corporation, Shenzhen (CN)

(72) Inventor: Feng Yue, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 125 days.

(21) Appl. No.: 14/913,406

(22) PCT Filed: Jun. 17, 2014

(86) PCT No.: PCT/CN2014/080139
§ 371 (c)(1),
(2) Date: Feb. 22, 2016

(87) PCT Pub. No.: WO2015/024408
PCT Pub. Date: Feb. 26, 2015

(65) Prior Publication Data
US 2016/0211990 A1 Jul. 21, 2016

(30) Foreign Application Priority Data
Aug. 21, 2013 (CN) .......................... 2013 1 0367359

(51) Int. Cl.
*H04L 12/707* (2013.01)
*H04L 12/723* (2013.01)
(Continued)

(52) U.S. Cl.
CPC ...... *H04L 12/4633* (2013.01); *H04L 12/4641* (2013.01); *H04L 45/22* (2013.01); *H04L 69/40* (2013.01); *H04L 45/30* (2013.01)

(58) Field of Classification Search
None
See application file for complete search history.

(56) References Cited

U.S. PATENT DOCUMENTS 7,590,054 B1 * 9/2009 Holness .............. H04L 12/4633
370/225
8,107,363 B1 1/2012 Saluja
(Continued)

FOREIGN PATENT DOCUMENTS

CN 101436976 A 5/2009
CN 101588296 A 11/2009
(Continued)

OTHER PUBLICATIONS

International Search Report for corresponding application No. PCT/CN2014/080139 filed on Jun. 17, 2014; dated Sep. 11, 2014.
(Continued)

*Primary Examiner* — Duc T Duong
(74) *Attorney, Agent, or Firm* — Cantor Colburn LLP

(57) ABSTRACT

A method and device for switching tunnels, and a switch are provided. The method includes that: a classid of a service route on a tunnel protection group is set as a first classid, wherein the tunnel protection group includes a first tunnel and a second tunnel; a redirection rule for the service route is determined according to the first classid; and the service route is switched from the first tunnel to the second tunnel according to the redirection rule and tunnel information of the second tunnel. By means of the method, the problem in the relevant art that a time delay is overlong due to respective switching of each service route in layer3 superposed protection is solved, and the time delay of service route switching is reduced.

17 Claims, 7 Drawing Sheets

(51) Int. Cl.
*H04L 12/46* (2006.01)
*H04L 29/14* (2006.01)
*H04L 12/725* (2013.01)

(56) References Cited

U.S. PATENT DOCUMENTS

| | | | |
|---|---|---|---|
| 2011/0038380 A1* | 2/2011 | Li | H04L 12/4633 370/401 |
| 2011/0142438 A1* | 6/2011 | Youn | H04J 14/0295 398/5 |
| 2012/0188867 A1* | 7/2012 | Fiorone | H04L 45/00 370/218 |
| 2012/0300617 A1* | 11/2012 | Ao | H04B 1/74 370/218 |
| 2013/0148663 A1 | 6/2013 | Xiong | |
| 2014/0376558 A1* | 12/2014 | Rao | H04L 47/2441 370/401 |
| 2016/0119229 A1* | 4/2016 | Zhou | H04L 12/4633 370/392 |

FOREIGN PATENT DOCUMENTS

| | | |
|---|---|---|
| CN | 101667970 A | 3/2010 |
| EP | 2490375 A1 | 8/2012 |
| KR | 1020050044970 A | 5/2005 |

OTHER PUBLICATIONS

European Saearch Report for corresponding application EP14838293: Report dated Jul. 27, 2016.

\* cited by examiner

METHOD AND DEVICE FOR SWITCHING TUNNELS AND SWITCH

TECHNICAL FIELD

The present invention relates to the field of communications, and in particular to a method and device for switching tunnels, and a switch.

BACKGROUND

A Multi-Protocol Label Switching (MPLS) Layer3 Virtual Private Network (L3VPN) is an L3VPN technology based on a service Provider Edge (PE) in a Service Provider (SP) VPN solution, which publishes a VPN route on a backbone network of an SP by using a Border Gateway Protocol (BGP) and forwards a VPN message on the backbone network of the SP by using MPLS.

The MPLS L3VPN has a flexible networking mode, is well expandable, and can conveniently support MPLS Quality of Service (QoS) and MPLS Traffic Engineering (TE), thereby obtaining an increasing number of applications.

An MPLS L3VPN model is composed of three parts namely a Customer Edge (CE) device, a PE device and a P device.

The CE device is also called a customer network edge device, directly connected to the SP via an interface. A CE may be a device or a switch and may be a host. The CE cannot 'perceive' the existence of a VPN and does not have to support the MPLS.

The PE device is also called a service PE device which is an edge device of an SP network and is directly connected to the CE of a customer. In an MPLS network, all processing for the VPN may occur on a PE.

The P device is a backbone device in the SP network, which is not directly connected to the CE. The P device only needs to have a basic MPLS forwarding ability.

The CE and the PE are mainly divided according to management ranges of the SP and the customer, and the CE and the PE are borders of the management ranges of the SP and the customer.

The CE device is a router generally, and when an adjacency relation is established between the CE and the PE directly connected thereto, the CE publishes the VPN route of this site and learns a far-end VPN route from the PE. Route information is switched between the CE and the PE by using the BGP/an Interior Gateway Protocol (IGP), and a static route can be used.

After learning local VPN route information of the CE from the CE, the PE switches the VPN route information to other PEs. A PE router only maintains the VPN route information directly connected thereto, and does not maintain all VPN routes in the SP network.

A P router only maintains a route to the PE and does not need to know any VPN route information.

When VPN traffic is transmitted on an MPLS backbone network, an ingress PE serves as an ingress Label Switch Router (LSR), an egress PE serves as an egress LSR, and the P router serves as a transit LSR.

In consideration of the forwarding reliability of an L3VPN service message, an L3VPN service can be protected by adopting a VPN Fast ReRoute (FRR), linear tunnel protection groups and loop network protection groups during networking, and three protection types can be freely combined.

FIG. 1 is a system structure diagram of superposed protection for an L3VPN service via three protection types. As shown in FIG. 1, there is an L3VPN service between a CE1 and a CE2, and a PE1->PE2 path and a PE1->PE3 path form the VPN FRR, wherein the PE1->PE2 path is a main VPN, and the PE1->PE3 path is a standby VPN; two paths of the PE1->PE2 path, namely a PE1->P1->PE2 path and a PE1->P2->PE2 path, form a main VPN linear tunnel protection group; two paths of the PE1->PE3 path, namely a PE1->P3->PE3 path and a PE1->P4->PE3 path, form a standby VPN linear tunnel protection group; the PE1->P1->PE2 path forms a main tunnel of a main VPN loop network protection group; a PE1->P1->PE2->P2->PE1 path forms a standby tunnel, also a loop tunnel, of the main VPN loop network protection group; likewise, the PE1->P3->PE3 path forms a main tunnel of a standby VPN loop network protection group; and a PE1->P3->PE3->P4->PE1 path forms a standby tunnel, also a loop tunnel, of the standby VPN loop network protection group. Layer3 superposed protection for the L3VPN service is formed by the VPN FRR, the linear tunnel protection groups and the loop network protection groups.

FIG. 2 is a flow diagram of uplink processing for an MPLS L3VPN of a PE device according to the relevant art. In FIG. 2, a processing flow of the L3VPN of an Application Specific Integrated Circuit (ASIC) chip, and next-hop forwarding information is obtained by route lookup for forwarding.

FIG. 3 is a switching process diagram of a Layer3 superposed protection method according to the relevant art. FIG. 3 shows a traditional MPLS L3VPN VPN FRR switching principle, namely: all possible next-hop forwarding tables (at most eight next-hop forwarding tables possibly) are created firstly; when switching is needed, a final forwarded next-hop is decided according to states of the linear tunnel protection groups, states of the loop network protection groups and a state of a VPN protection group; when the state of the VPN protection group changes or the state of each tunnel protection group changes, it is necessary to judge whether next-hop switching is needed; a great number of next-hop resources (namely the created next-hop forwarding tables) are consumed, and meanwhile, the complexity of the flow is higher; for example, if the states of the tunnel protection groups change, all services (namely service routes) on the tunnel protection groups need to be switched respectively; and thus, time for switching the tunnel protection groups will not meet a requirement of 50 ms when there are a lot of services.

An effective solution is not proposed currently for the problem in the relevant art that a time delay is overlong due to respective switching of each service route in layer3 superposed protection.

SUMMARY

The embodiments of the present invention provide a method and device for switching tunnels, and a switch, which are intended to at least solve the problem in the relevant art that the time delay is overlong due to respective switching of each service route in layer3 superposed protection.

According to one aspect of an embodiment of the present invention, a method for switching tunnels is provided, which may include that: a classid of a service route on a tunnel protection group is set as a first classid, wherein the tunnel protection group may include a first tunnel and a second tunnel; a redirection rule for the service route is determined according to the first classid; and the service route is switched from the first tunnel to the second tunnel according to the redirection rule and tunnel information of the second tunnel.

Preferably, the step that the redirection rule for the service route is determined according to the first classid may include that: an Access Control List (ACL) is looked up according to the first classid; and the redirection rule corresponding to the first classid in the ACL is determined.

Preferably, before the ACL is looked up, the method may further include that: it is determined that the service route is switched to the second tunnel according to a working state of the tunnel protection group; and the redirection rule corresponding to the first classid in the ACL is updated according to the tunnel information of the second tunnel.

Preferably, the step that the service route is switched from the first tunnel to the second tunnel according to the redirection rule and the tunnel information of the second tunnel may include that: each service route in the tunnel protection group is configured with next-hop information according to the redirection rule and the tunnel information of the second tunnel respectively; and according to the configured next-hop information, the corresponding service route is switched from the first tunnel and the second tunnel respectively.

Preferably, the step that each service route in the tunnel protection group is configured with the next-hop information according to the redirection rule and the tunnel information of the second tunnel respectively may include that: egress port information in the next-hop information of each service route is configured according to the egress port information of a next hop for switching to the second tunnel in the redirection rule; and destination Media Access Control (MAC) address information and layer3 interface information in the next-hop information of each service route are configured according to the destination MAC address information of a service PE device on the second tunnel and the layer3 interface information of the second tunnel.

Preferably, the first tunnel may be one of a main tunnel and a standby tunnel of the tunnel protection group while the second tunnel may be the other one of the main tunnel and the standby tunnel of the tunnel protection group.

Preferably, before the classid of the service route on the tunnel protection group is set as the first classid, the method may further include that: it is determined that the service route is switched to the tunnel protection group, wherein the tunnel protection group may be a linear tunnel protection group or a loop network protection group.

Preferably, before it is determined that the service route is switched to the tunnel protection group, the method may further include that: it is determined that the service route is switched from a first VPN protection group to a second VPN protection group, wherein the first VPN protection group may be one of a main VPN protection group and a standby VPN protection group while the second VPN protection group may be the other one of the main VPN protection group and the standby VPN protection group, and the second VPN protection group may include the linear tunnel protection group and the loop network protection group.

According to another aspect of an embodiment of the present invention, a device for switching tunnels is also provided, which may include: a setting module, configured to set a classid of a service route on a tunnel protection group as a first classid, wherein the tunnel protection group may include a first tunnel and a second tunnel; a determining module, configured to determine a redirection rule for the service route according to the first classid; and a switching module, configured to switch the service route from the first tunnel to the second tunnel according to the redirection rule and tunnel information of the second tunnel.

According to another aspect of an embodiment of the present invention, a switch is also provided, which may include the tunnel switching device.

By means of the embodiments of the present invention, in a mode of setting the classid of the service route on the tunnel protection group, including the first tunnel and the second tunnel, as the first classid, determining the redirection rule for the service route according to the first classid and switching the service route from the first tunnel to the second tunnel according to the redirection rule and the tunnel information of the second tunnel, the problem in the relevant art that the time delay is overlong due to respective switching of each service route in layer3 superposed protection is solved, and the time delay of service route switching is reduced.

BRIEF DESCRIPTION OF THE DRAWINGS

The drawings described herein are intended to provide further understanding of the present invention, and form a part of the present invention. The schematic embodiments and description of the present invention are intended to explain the present invention, and do not form improper limits to the present invention. In the drawings.

DETAILED DESCRIPTION OF THE EMBODIMENTS

It is important to note that the embodiments of the present invention and the characteristics in the embodiments can be combined under the condition of no conflicts. The present invention is described below with reference to the drawings and the embodiments in detail.

The steps shown in the flowcharts of the drawings can be executed in a computer system including, for example, a group of computer executable instructions, and moreover, although a logical sequence is shown in the flowcharts, the shown or described steps can be executed in a sequence different from the sequence here under certain conditions.

Figure 4:
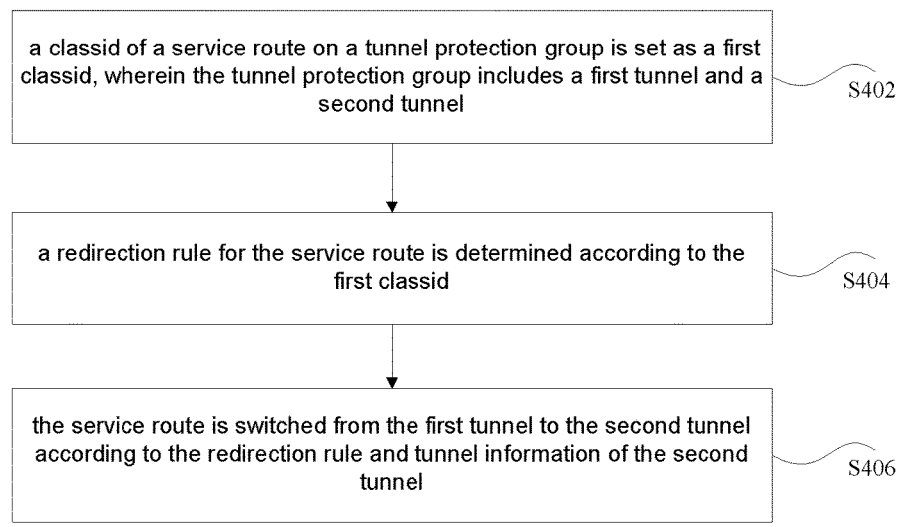
FIG. 4 is a flow diagram of a tunnel switching method according to an embodiment of the present invention.

An embodiment of the present invention provides a method for switching tunnels. FIG. 4 is a flow diagram of a tunnel switching method according to an embodiment of the present invention. As shown in FIG. 4, the method includes the following steps that:

Step S402: a classid of a service route on a tunnel protection group is set as a first classid, wherein the tunnel protection group includes a first tunnel and a second tunnel;

Step S404: a redirection rule for the service route is determined according to the first classid; and Step S406: the service route is switched from the first tunnel to the second tunnel according to the redirection rule and tunnel information of the second tunnel. By means of the steps, a mode of switching a working tunnel of the service route according to the redirection rule corresponding to the first classid of the service route is adopted, so that during tunnel switching, all service routes can be simultaneously switched by changing the corresponding redirection rules. Compared with a mode of switching each service route in the relevant art respectively, the mode in the present invention reduces the time delay of service route switching.

Wherein, the tunnel protection group may be any one of a main VPN linear tunnel protection group, a standby VPN linear tunnel protection group, a main VPN loop network protection group or a standby VPN loop network protection group. Preferably, each protection group in a layer3 superposed protection system including the main VPN linear tunnel protection group, the standby VPN linear tunnel protection group, the main VPN loop network protection group and the standby VPN loop network protection group can be switched by adopting the method.

Preferably, under the condition that the redirection rule is maintained by adopting an ACL, in Step S404, the ACL can be inquired according to the first classid, and the redirection rule corresponding to the first classid in the ACL is determined. In the mode, the redirection rule can be maintained by utilizing a conventional ACL of a system, so that an implementation mode with practical operability is provided, and can be well compatible with a conventional switching device.

Preferably, a working tunnel of the service route is located on the first tunnel, and under the condition that it is determined that the service route is switched from the first tunnel to the second tunnel according to working states of the first tunnel and the second tunnel of the tunnel protection group, the redirection rule corresponding to the first classid in the ACL can be updated according to the tunnel information of the second tunnel (for example, egress port information of a next hop on the second tunnel). For example, egress port information of a next hop in the redirection rule is updated to the egress port information of the next hop on the second tunnel. Due to the fact that the egress port information of the corresponding next hop is searched according to the redirection rule corresponding to the first classid during switching of each service route, after the redirection rule is updated, all service routes will simultaneously search for next hops according to the updated redirection rule, so that all the service routes can be simultaneously switched.

Preferably, during the switching of the service route, Step S406 may include that: each service route in the tunnel protection group is configured with next-hop information according to the redirection rule and the tunnel information of the second tunnel respectively; and according to the configured next-hop information, the corresponding service route is switched from the first tunnel and the second tunnel. In a traditional service route switching mode, two pieces of next-hop information (including a main next hop and a standby next hop, equivalent to the next hop of the first tunnel and the next hop of the second tunnel) need to be created for each service route in each tunnel protection group, and a certain one of the two pieces of next-hop information is selected as needed. Compared with a mode of only creating one piece of next-hop information in this mode, this mode has the advantages that next-hop resources occupied by each service route are halved, thereby saving the next-hop resources and reducing the cost of a device. Due to the fact that each service route is configured with only one piece of next-hop information, the next-hop information needs to be configured according to switched target tunnel information before tunnel switching.

Preferably, the step that each service route in the tunnel protection group is configured with the next-hop information according to the redirection rule and the tunnel information of the second tunnel respectively includes that: egress port information in the next-hop information of each service route is configured according to the egress port information of the next hop for switching to the second tunnel in the redirection rule; and destination MAC address information and layer3 interface information in the next-hop information of each service route are configured according to the destination MAC address information of a service PE device on the second tunnel and the layer3 interface information of the second tunnel. In this mode, a preferred mode of configuring the next-hop information is provided, namely only the egress port information, the destination MAC address information and the layer3 interface information in the next-hop information are updated.

Preferably, the first tunnel is one of a main tunnel and a standby tunnel of the tunnel protection group while the second tunnel is the other one of the main tunnel and the standby tunnel of the tunnel protection group, namely the mode can be applied to a process of switching from the main tunnel to the standby tunnel and can also be applied to a process of switching from the standby tunnel to the main tunnel. Preferably, under the condition that a certain tunnel of one tunnel protection group and a certain tunnel of another tunnel protection group are superposed, the two channels between the two tunnel protection groups can be indirectly switched via the superposed tunnels.

Preferably, the tunnel protection group is one of a linear tunnel protection group or the loop network protection group, wherein the linear tunnel protection group and the loop network protection group are both located in the same VPN protection group which may be a main VPN protection group or a standby VPN protection group. Preferably, before the classid of the service route on the tunnel protection group is set as the first classid, it can be determined that the service route is switched to a certain one of the linear tunnel protection group and the loop network protection group according to the working states of the linear tunnel protection group and the loop network protection group, and the tunnel switching method is realized in the switched tunnel protection group.

Preferably, before it is determined that the service route is switched to a certain one of the linear tunnel protection group and the loop network protection group, it can be firstly determined that the VPN protection group where the linear tunnel protection group and the loop network protection group are located is the main VPN protection group or the standby VPN protection group. For example, it can be determined that the service route is switched from a first VPN protection group to a second VPN protection group according to working states of the first VPN protection group and the second VPN protection group, wherein the first VPN protection group is one of the main VPN protection group and the standby VPN protection group while the second VPN protection group is the other one of the main VPN protection group and the standby VPN protection group.

An embodiment of the present invention also provides a device to realize the method for switching tunnels. Meanwhile, the tunnel switching device described in the device embodiment corresponds to the method embodiment, a specific realizing process thereof has been explained in the method embodiment, and a detailed description is unnecessary.

Figure 5:
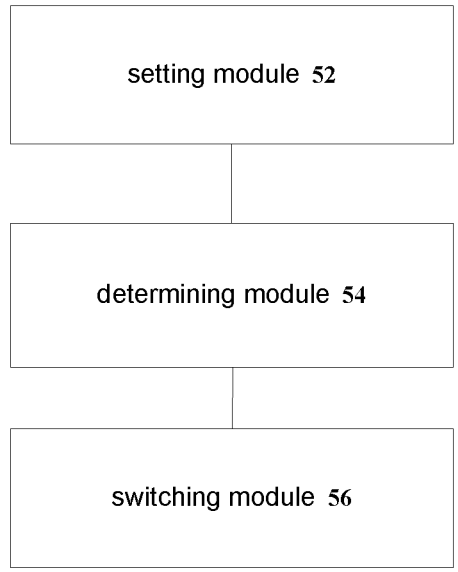
FIG. 5 is a structure diagram of a tunnel switching device according to an embodiment of the present invention.

FIG. 5 is a structure diagram of a tunnel switching device according to an embodiment of the present invention. As shown in FIG. 5, the device includes: a setting module 52, a determining module 54 and a switching module 56, wherein the setting module 52 is configured to set a classid of a service route on a tunnel protection group as a first classid, and the tunnel protection group includes a first tunnel and a second tunnel; the determining module 54 is coupled to the setting module 52 and is configured to determine a redirection rule for the service route according to the first classid; and the switching module 56 is coupled to the setting module 52 and is configured to switch the service route from the first tunnel to the second tunnel according to the redirection rule and tunnel information of the second tunnel.

The modules and units involved in the embodiment of the present invention can be realized in a software way or in a hardware way. The modules and the units described in the embodiment can also be arranged in a processor. For example, it can be described that: the processor includes the setting module 52, the determining module 54 and the switching module 56, wherein the names of these modules do not form limits to the own modules under certain conditions. For example, the setting module can also be described as 'a module configured to set the classid of the service route on the tunnel protection group as the first classid'.

Figure 6:
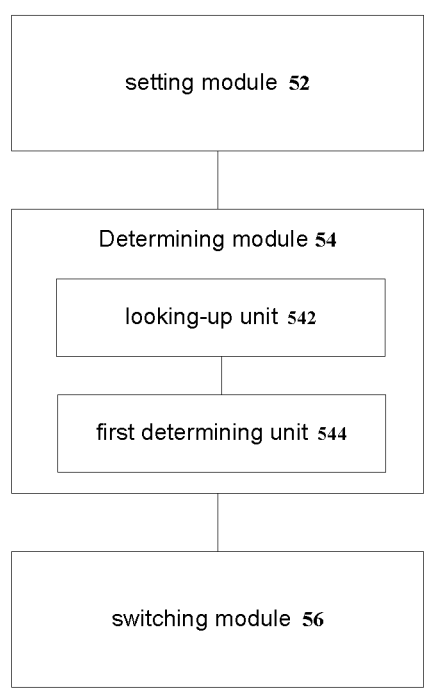
FIG. 6 is a preferred structure diagram 1 of a tunnel switching device according to an embodiment of the present invention.

FIG. 6 is a preferred structure diagram 1 of a tunnel switching device according to an embodiment of the present invention. As shown in FIG. 6, preferably, the determining module 54 includes: a looking-up unit 542, configured to look up an ACL according to the first classid; and a first determining unit 544, configured to determine the redirection rule corresponding to the first classid in the ACL.

Figure 7:
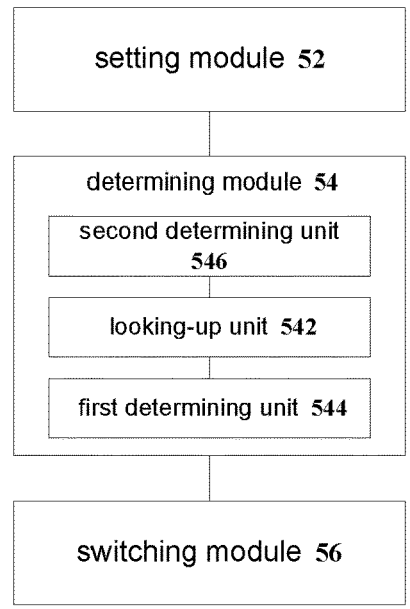
FIG. 7 is a preferred structure diagram 2 of a tunnel switching device according to an embodiment of the present invention.

FIG. 7 is a preferred structure diagram 2 of a tunnel switching device according to an embodiment of the present invention. As shown in FIG. 7, preferably, the determining module further includes: a second determining unit 546, configured to determine that the service route is switched to the second tunnel according to a working state of the tunnel protection group; and an updating unit 548, coupled to the second determining unit 546 and the looking-up unit 542, and configured to update the redirection rule corresponding to the first classid in the ACL according to the tunnel information of the second tunnel.

Figure 8:
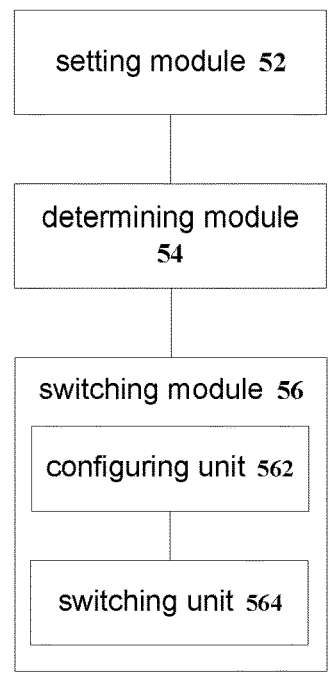
FIG. 8 is a preferred structure diagram 3 of a tunnel switching device according to an embodiment of the present invention.

FIG. 8 is a preferred structure diagram 3 of a tunnel switching device according to an embodiment of the present invention. As shown in FIG. 8, preferably, the switching module 56 includes: a configuring unit 562, configured to configure each service route in the tunnel protection group with next-hop information according to the redirection rule and the tunnel information of the second tunnel respectively; and a switching unit 564, coupled to the configuring unit 562, and configured to switch the corresponding service route from the first tunnel to the second tunnel according to the configured next-hop information respectively.

Preferably, the configuring unit 562 includes: a first configuring sub-unit, configured to configure egress port information in the next-hop information of each service route according to the egress port information of a next hop for switching to the second tunnel in the redirection rule; and a second configuring sub-unit, configured to configure destination MAC address information and layer3 interface information in the next-hop information of each service route according to the destination MAC address information of a service PE device on the second tunnel and the layer3 interface information of the second tunnel.

Preferably, the first tunnel is one of a main tunnel and a standby tunnel of the tunnel protection group while the second tunnel is the other one of the main tunnel and the standby tunnel of the tunnel protection group.

Figure 9:
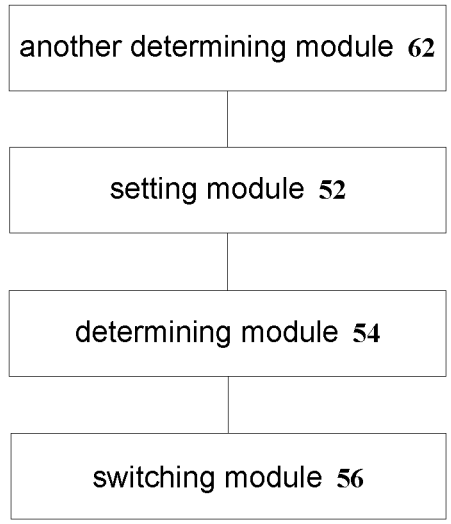
FIG. 9 is a preferred structure diagram 4 of a tunnel switching device according to an embodiment of the present invention.

FIG. 9 is a preferred structure diagram 4 of a tunnel switching device according to an embodiment of the present invention. As shown in FIG. 9, preferably, the device further includes: another determining module 62, coupled to the setting module 52, and configured to determine that the service route is switched to the tunnel protection group, wherein the tunnel protection group is a linear tunnel protection group or a loop network protection group.

Figure 10:
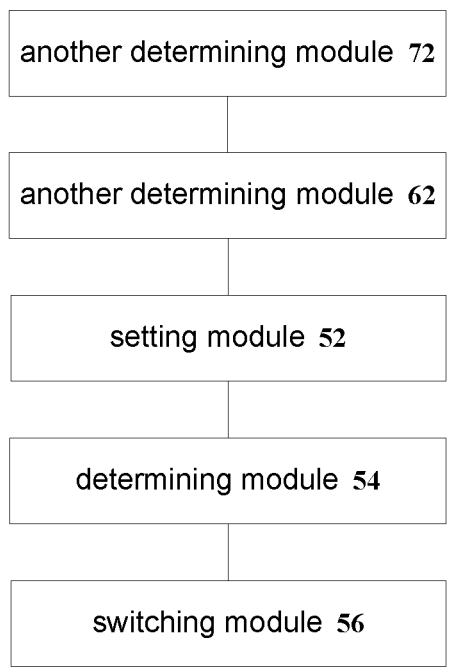
FIG. 10 is a preferred structure diagram 5 of a tunnel switching device according to an embodiment of the present invention.

FIG. 10 is a preferred structure diagram 5 of a tunnel switching device according to an embodiment of the present invention. As shown in FIG. 10, preferably, the device further includes: another determining module 72, coupled to the determining module 62, and configured to determine that the service route is switched from a first VPN protection group to a second VPN protection group, wherein the first VPN protection group is one of a main VPN protection group and a standby VPN protection group while the second VPN protection group is the other one of the main VPN protection group and the standby VPN protection group, and the second VPN protection group includes the linear tunnel protection group and the loop network protection group.

An embodiment also provides a switch which includes the tunnel switching device. Descriptions and explanations are performed below with reference to a preferred embodiment.

The preferred embodiment relates to network devices such as the switch. A method and system for realizing simple and efficient layer3 superposed protection for an MPLS L3VPN VPN FRR, the linear tunnel protection group and the loop network protection group are proposed in the preferred embodiment.

The realization of a solution of the preferred embodiment is described below.

Figure 11:
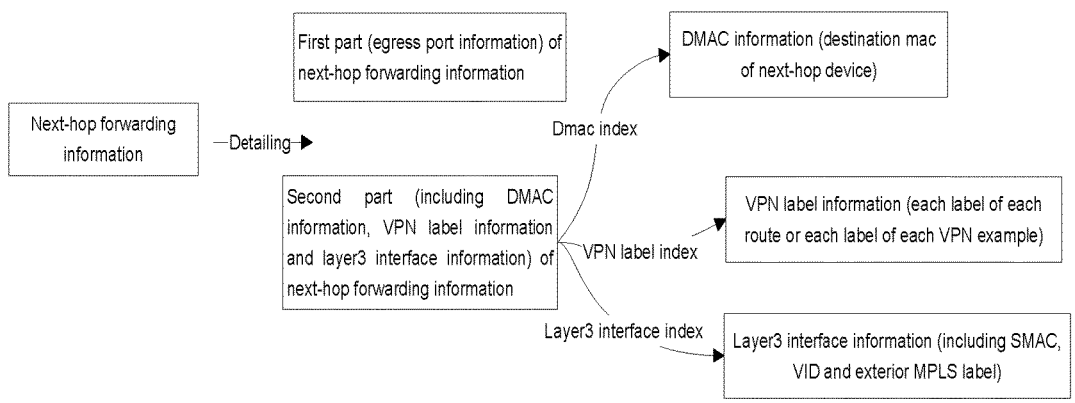
FIG. 11 is a configuration diagram of next-hop information according to a preferred embodiment of the present invention.

FIG. 11 is a configuration diagram of next-hop information according to a preferred embodiment of the present invention. As shown in FIG. 11, there are only three parts needing to be changed actually for forwarding of a next-hop table entry after the linear tunnel protection group or the loop network protection group is switched, namely, 1, physical egress port information, 2, layer3 interface information including VLAN information, source MAC address information and tunnel label information, and 3, destination MAC information, wherein the destination MAC information and the layer3 interface information refer to indexing of forwarded next hops corresponding to all services over layer3 interfaces to the same multiplexing table entry, are irrelevant to the number of routes, and can be directly modified, and the egress port information of each next hop needs to be modified, however, by each next hop one by one.

In the preferred embodiment, in order to solve the problem that an egress port of each next hop on the tunnel protection group needs to be modified one by one, a method for redirection via the ACL is adopted, which includes that: each tunnel protection group corresponds to a classid, an ACL rule matching with the classid is set, and a message is redirected to an egress port of the main tunnel or the standby tunnel according to main and standby states of the tunnel protection group. When a route is added to the tunnel protection group, the message can be redirected to a correct egress port by setting the classid of the route as the classid of the tunnel protection group, so that during the switching of the tunnel protection group, all next-hop egress ports can be switched by updating the egress port of the ACL rule regardless of the number of routes in the protection group.

During the switching of the tunnel protection group, 3 parts in the abovementioned next-hop table entry need to be updated, namely, the tunnel protection group can be switched by switching 3 table entries in the tunnel protection group regardless of the number of the routes and the number of VPN FRR groups.

Figure 12:
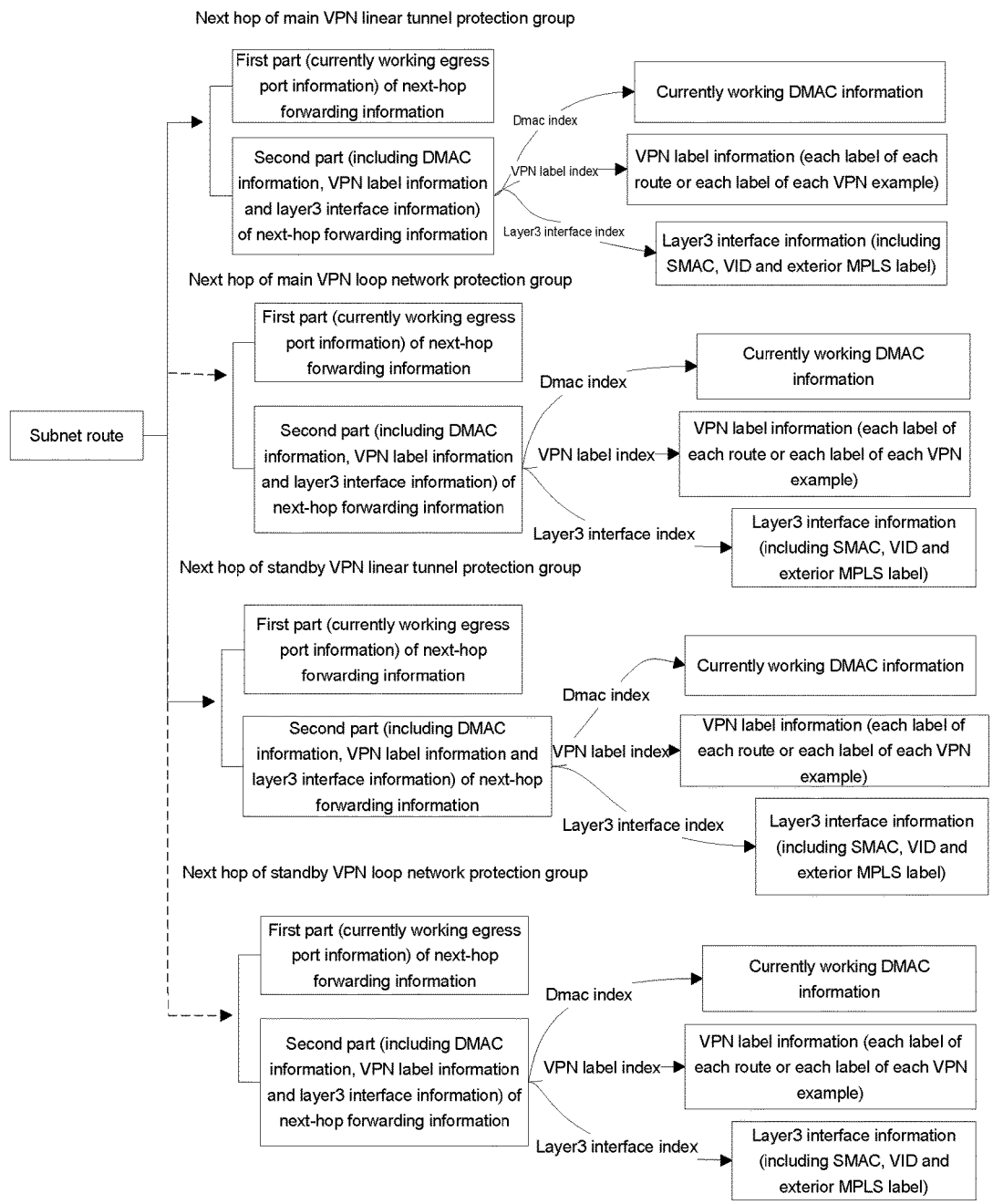
FIG. 12 is a diagram of a switching process for a layer3 superposed protection method according to a preferred embodiment of the present invention.

FIG. 12 is a diagram of a switching process for a layer3 superposed protection method according to a preferred embodiment of the present invention. As shown in FIG. 12, if the VPN FRR needs to be switched, 4 next hops are established, namely a main VPN linear tunnel protection group next hop, a main VPN loop network protection group next hop, a standby VPN linear tunnel protection group next hop and a standby VPN loop network protection group next hop. During the switching of the VPN FRR, a main VPN or a standby VPN is selected to work according to the state of the VPN FRR firstly, then the linear tunnel protection group next hops or the loop network protection group next hops are selected according to the states of the linear tunnel protection group and the loop network protection group, and then a current service next hop is updated, so that tunnel switching is realized.

Thus, it can be seen that compared with a traditional ASIC chip realizing method, the solution of the preferred embodiment is simpler and more efficient, quick switching of the tunnel protection group can be realized when a plurality of services are protected without the need of changing the egress ports of the services one by one, and about half of next-hop resources can be saved.

The solution provided by the preferred embodiment mainly includes steps as follows.

Step A: in the presence of layer3 superposed protection of an L3VPN VPN FRR, a linear tunnel protection group and a loop network protection group, four next hops namely two main VPN next hops and two standby VPN next hops are established and used by four tunnel protection groups.

Step B: an ACL redirection rule is set for the linear tunnel protection group and the loop network protection group which are superposed, and the rule acts on matching with a classid of a message, and redirecting the message to an egress port of a tunnel, wherein the tunnel protection groups are in one-to-one correspondence to the classids, and when a service is added to one of the tunnel protection groups, the classid of this service route is in accordance with the classid of the tunnel protection group.

Step C: if a protocol detects that L3VPN VPN FRR switching needs to be performed, the main VPN or the standby VPN is judged to work firstly, then a linear tunnel protection group next hop or a loop network protection group next hop is selected according to the situations of the tunnel protection group in which the VPN works, and then the next hop is updated to a route table.

Step D: if the protocol detects that the linear tunnel protection group or the loop network tunnel protection group needs to be switched, the egress port information of the ACL redirection rule is directly updated, corresponding working destination MAC information is updated, and layer3 interface information is updated, wherein the layer3 interface information includes: a source MAC address, a VLAN ID (VID) and an exterior MPLS label.

Compared with the relevant art, the preferred embodiment proposes a method for realizing layer3 superposed protection of the MPLS L3VPN VPN FRR, the linear tunnel protection group and the loop network protection group, the switching time of the linear tunnel protection group and the loop network protection group is irrelevant to the quantity of an L3VPN service, and meanwhile, tunnel protection group switching and VPN FRR switching can be separated, so that the switching time is greatly shortened, the complexity of a system is reduced, a great number of hardware resources are saved, and the cost can be reduced.

A method and system for realizing the layer3 superposed protection of the MPLS L3VPN on a switching chip according to the preferred embodiment are explained below with reference to the drawings.

Figure 1:
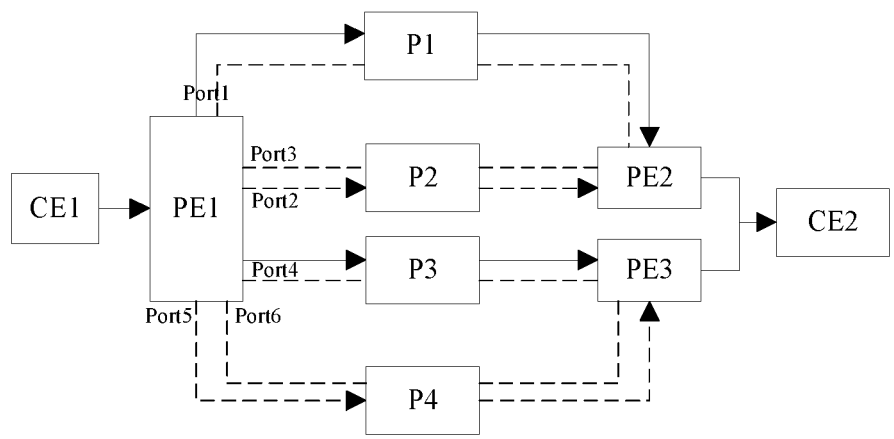
FIG. 1 is a system structure diagram of superposed protection for an L3VPN service via three protection types.
Figure 2:
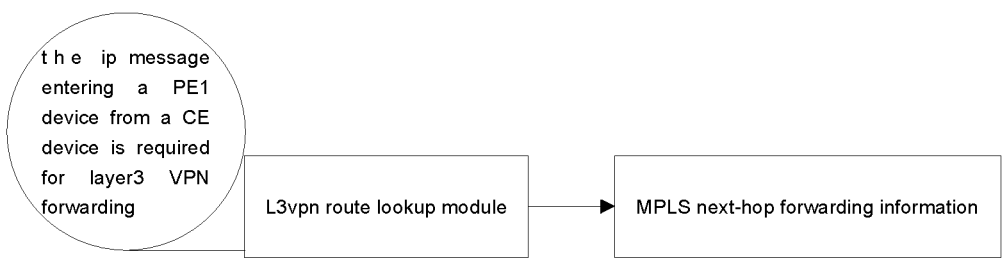
FIG. 2 is a flow diagram of uplink processing for an MPLS L3VPN of a PE device according to the relevant art.
Figure 3:
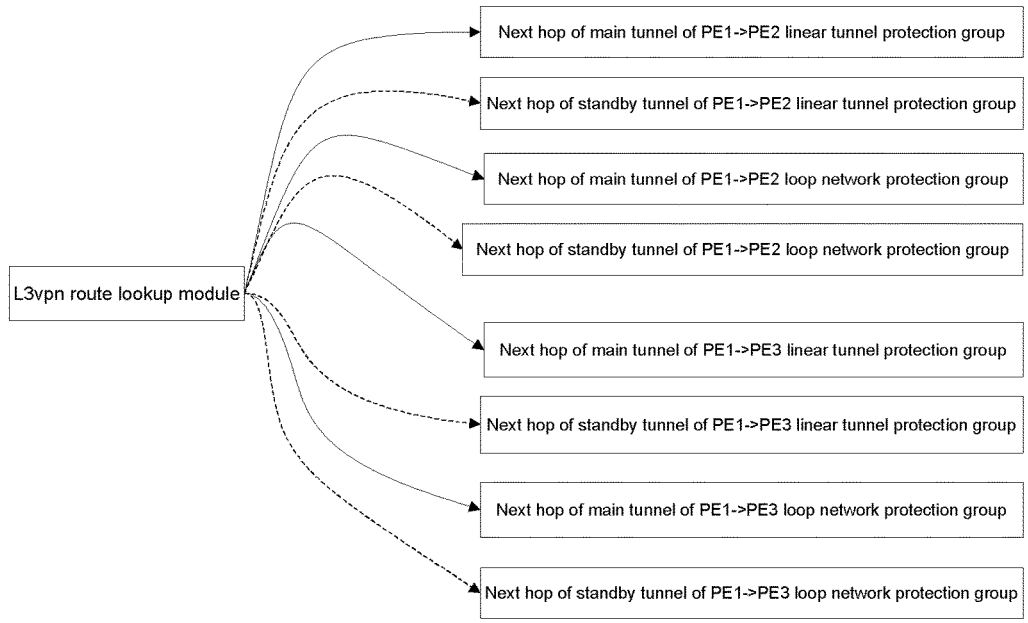
FIG. 3 is a switching process diagram of a layer3 superposed protection method according to the relevant art.

As shown in FIG. 1, there are four CE1 to CE2 paths. A PE1->PE2 path and a PE1->PE3 path form a VPN FRR, wherein the PE1->PE2 path is a main path, and the PE1->PE3 path is a standby path; a PE1->P1->PE2 path and a PE1->P2->PE2 path form a main VPN linear tunnel protection group; a PE1->P3->PE3 path and a PE1->P4->PE3 path form a standby VPN tunnel FRR; and the PE1->P3->PE3 path and a PE1->P3->PE3->P4->PE1 path form a standby VPN loop network protection group, so that L3VPN layer3 superposed protection is formed on a PE1.

A handling process on a PE1 device is explained blow. It is assumed that egress ports of the PE1->PE2 path are 1, 2 and 3, which represent main and standby ports of the main VPN linear tunnel protection group and a standby port of the loop network protection group respectively. Due to superposition of a main tunnel of the loop network protection group and a main tunnel of the linear protection group, a main port of the loop network protection group is 1. Likewise, egress ports of the PE1->PE3 path are 4, 5 and 6, which represent main and standby ports of the standby VPN linear tunnel protection group and the standby port of the loop network protection group respectively. It is assumed that a linear tunnel protection group existing in the PE1->PE2 path is a tunnel protection group 1, a loop network protection group is a tunnel protection group 2, a linear tunnel protection group existing in the PE1->PE3 path is a tunnel protection group 3, and a loop network protection group is a tunnel protection group 4. It is assumed that 1 K routes exist, L3VPN VPN FRR superposed linear tunnel protection groups and superposed loop network protection groups are formed. An implementation method according to the preferred embodiment may include the steps as follows.

Step 1: route information is added to an ASIC chip, and main next-hop information and standby next-hop information are established simultaneously. In the presence of 1 K routes, 1 K route tables are formed, 4 K next hops are forwarded, and 4 ACL redirection rules correspond to 4 tunnel protection groups respectively.

Step 2: due to simultaneous superposition of a linear tunnel protection group and a loop network protection group to an L3VPN VPN FRR, port information of the 4 K next hops is modified; and according to a working state of a current protection group, a classid of each route is set as a classid of a corresponding working tunnel protection group, and according to the working state of the tunnel protection group, an egress port of the corresponding ACL redirection rule is set as a current working port.

Step 3: if the tunnel protection group 1 is switched to MAIN, an egress port of the corresponding ACL rule 1 only needs to be updated to 1, a destination MAC corresponding to the tunnel protection group is updated to a destination MAC of a P1, and layer3 interface information (all L3VPN VPN FRR main next hops point to a layer3 interface index) corresponding to the tunnel protection group is updated.

Step 4: if the tunnel protection group 1 is switched to STANDBY, the egress port of the ACL rule 1 only needs to be updated to 2, the destination MAC corresponding to the tunnel protection group is updated to a destination MAC of a P2, and the layer3 interface information (all the L3VPN VPN FRR main next hops point to the layer3 interface index) corresponding to the tunnel protection group is updated.

Step 5: if the tunnel protection group 2 is switched to MAIN, an egress port of the corresponding ACL rule 2 only needs to be updated to 1, the destination MAC corresponding to the tunnel protection group is updated to the destination MAC of the P1, and the layer3 interface information (all L3VPN VPN FRR standby next hops point to the layer3 interface index) corresponding to the tunnel protection group is updated.

Step 6: if the tunnel protection group 2 is switched to STANDBY, the egress port of the ACL rule 2 only needs to be updated to 3, the destination MAC corresponding to the tunnel protection group is updated to the destination MAC of the P2, and the layer3 interface information (all the L3VPN VPN FRR standby next hops point to the layer3 interface index) corresponding to the tunnel protection group is updated.

Step 7: switching processes for the tunnel protection groups 3 and 4 are the same as processes in Step 3 to Step 6, according to the states of the protection groups, egress ports (certain ports in ports 4 to 7) of the corresponding ACL redirection rules are updated, and the layer3 interface information is updated.

Step 8: if the L3VPN VPN FRR of a certain route is switched to MAIN, if the main VPN works in the linear tunnel protection group, next hops of the linear tunnel protection group are switched, and if the main VPN works in the loop network protection group, next hops of the loop network protection group are switched.

Step 9: if the L3VPN VPN FRR of a certain route is switched to STANDBY, if the standby VPN works in the linear tunnel protection group, the next hops of the linear tunnel protection group are switched, and if the standby VPN works in the loop network protection group, the next hops of the loop network protection group are switched.

In the steps, Step 3 to Step 7 belong to tunnel protection group switching, although the steps are relevant to the 1K routes, only the switching time instead of route information are concerned, only 3 table entries need to be switched, the switching time is irrelevant to route entries, and switching is fast; and Step 8 to Step 9 belong to VPN FRR switching, which aims at a certain trigger route, switching is performed once for one route, the states of the relevant tunnel protection groups do not need to be concerned, two flows are independent, and a switching process is simple.

INDUSTRIAL APPLICABILITY

By means of the embodiments of the present invention, in a mode of setting the classid of the service route on the tunnel protection group, including the first tunnel and the second tunnel, as the first classid, determining the redirection rule for the service route according to the first classid and switching the service route from the first tunnel to the second tunnel according to the redirection rule and the tunnel information of the second tunnel, the problem in the relevant art that the time delay is overlong due to respective switching of each service route in layer3 superposed protection is solved, and the time delay of service route switching is reduced.

Obviously, those skilled in the art should understand that all modules or all steps in the present invention can be realized by using a general computation apparatus, can be centralized on a single computation apparatus or can be distributed on a network composed of a plurality of computation apparatuses. Optionally, they can be realized by using executable program codes of the computation apparatuses, so that they can be stored in a storage apparatus and executed by the computation apparatuses or are manufactured into each integrated circuit module respectively, or a plurality of modules or steps therein are manufactured into a single integrated circuit module. Thus, the present invention is not limited to combination of any specific hardware and software.

The above is only the preferred embodiments of the present invention, and is not intended to limit the present invention. There can be various modifications and variations in the present invention for those skilled in the art. Any modifications, equivalent replacements, improvements and the like within the spirit and principle of the present invention shall fall within the protection scope of the present invention.

What is claimed is:

1. A method for switching tunnels, comprising:
    setting a classid of a service route on a tunnel protection group as a first classid, wherein the tunnel protection group comprises a first tunnel and a second tunnel;
    determining a redirection rule for the service route according to the first classid; and
    switching the service route from the first tunnel to the second tunnel according to the redirection rule and tunnel information of the second tunnel;
    wherein determining the redirection rule for the service route according to the first classid comprises: looking up an Access Control List (ACL) according to the first classid; and determining the redirection rule corresponding to the first classid in the ACL.

2. The method according to claim 1, wherein before the ACL is looked up, the method further comprises:
    determining that the service route is switched to the second tunnel according to a working state of the tunnel protection group; and
    updating the redirection rule corresponding to the first classid in the ACL according to the tunnel information of the second tunnel.

3. The method according to claim 2, wherein the first tunnel is one of a main tunnel and a standby tunnel of the tunnel protection group while the second tunnel is the other one of the main tunnel and the standby tunnel of the tunnel protection group.

4. The method according to claim 2, wherein before the classid of the service route on the tunnel protection group is set as the first classid, the method further comprises:
    determining that the service route is switched to the tunnel protection group, wherein the tunnel protection group is a linear tunnel protection group or a loop network protection group.

5. The method according to claim 1, wherein switching the service route from the first tunnel to the second tunnel according to the redirection rule and the tunnel information of the second tunnel comprises:
   configuring each service route in the tunnel protection group with next-hop information according to the redirection rule and the tunnel information of the second tunnel respectively; and
   switching, according to the configured next-hop information, the corresponding service route from the first tunnel and the second tunnel respectively.

6. The method according to claim 5, wherein configuring each service route in the tunnel protection group with the next-hop information according to the redirection rule and the tunnel information of the second tunnel respectively comprises:
   configuring egress port information in the next-hop information of each service route according to the egress port information of a next hop for switching to the second tunnel in the redirection rule; and
   configuring destination Media Access Control (MAC) address information and layer3 interface information in the next-hop information of each service route according to the destination MAC address information of a service Provider Edge (PE) device on the second tunnel and the layer3 interface information of the second tunnel.

7. The method according to claim 6, wherein the first tunnel is one of a main tunnel and a standby tunnel of the tunnel protection group while the second tunnel is the other one of the main tunnel and the standby tunnel of the tunnel protection group.

8. The method according to claim 6, wherein before the classid of the service route on the tunnel protection group is set as the first classid, the method further comprises:
   determining that the service route is switched to the tunnel protection group, wherein the tunnel protection group is a linear tunnel protection group or a loop network protection group.

9. The method according to claim 5, wherein the first tunnel is one of a main tunnel and a standby tunnel of the tunnel protection group while the second tunnel is the other one of the main tunnel and the standby tunnel of the tunnel protection group.

10. The method according to claim 5, wherein before the classid of the service route on the tunnel protection group is set as the first classid, the method further comprises:
   determining that the service route is switched to the tunnel protection group, wherein the tunnel protection group is a linear tunnel protection group or a loop network protection group.

11. The method according to claim 1, wherein the first tunnel is one of a main tunnel and a standby tunnel of the tunnel protection group while the second tunnel is the other one of the main tunnel and the standby tunnel of the tunnel protection group.

12. The method according to claim 1, wherein before the classid of the service route on the tunnel protection group is set as the first classid, the method further comprises:
   determining that the service route is switched to the tunnel protection group, wherein the tunnel protection group is a linear tunnel protection group or a loop network protection group.

13. The method according to claim 12, wherein before it is determined that the service route is switched to the tunnel protection group, the method further comprises:
   determining that the service route is switched from a first Virtual Private Network (VPN) protection group to a second VPN protection group, wherein the first VPN protection group is one of a main VPN protection group and a standby VPN protection group while the second VPN protection group is the other one of the main VPN protection group and the standby VPN protection group, and the second VPN protection group comprises the linear tunnel protection group and the loop network protection group.

14. The method according to claim 1, wherein the first tunnel is one of a main tunnel and a standby tunnel of the tunnel protection group while the second tunnel is the other one of the main tunnel and the standby tunnel of the tunnel protection group.

15. The method according to claim 1, wherein before the classid of the service route on the tunnel protection group is set as the first classid, the method further comprises:
   determining that the service route is switched to the tunnel protection group, wherein the tunnel protection group is a linear tunnel protection group or a loop network protection group.

16. A device for switching tunnels, comprising a hardware processor configured to execute program modules stored on a memory, wherein the program modules comprises:
   a setting module, connected with a determining module and configured to set a classid of a service route on a tunnel protection group as a first classid, wherein the tunnel protection group comprises a first tunnel and a second tunnel;
   the determining module, connected with a switching module and configured to determine a redirection rule for the service route according to the first classid; and
   the switching module, connected with the determining module and configured to switch the service route from the first tunnel to the second tunnel according to the redirection rule and tunnel information of the second tunnel;
   the determining module further includes: a looking-up unit, configured to look up an ACL according to the first classid; and a first determining unit, configured to determine the redirection rule corresponding to the first classid in the ACL.

17. A switch, comprising the device for switching tunnels according to claim 16.

* * * * *